US012664921B2

(12) United States Patent
Yun

(10) Patent No.: US 12,664,921 B2
(45) Date of Patent: Jun. 23, 2026

(54) DISPLAY APPARATUS AND DRIVING METHOD THEREOF

(71) Applicant: LG Display Co., Ltd., Seoul (KR)

(72) Inventor: Seong Ho Yun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/986,262

(22) Filed: Dec. 18, 2024

(65) Prior Publication Data

US 2025/0225898 A1 Jul. 10, 2025

(30) Foreign Application Priority Data

Dec. 29, 2023 (KR) ........................ 10-2023-0197233

(51) Int. Cl.

*G09G 3/06* (2006.01)
*G09G 3/00* (2006.01)
*G09G 3/3233* (2016.01)

(52) U.S. Cl.

CPC ........... *G09G 3/006* (2013.01); *G09G 3/3233* (2013.01); *G09G 2300/0842* (2013.01); *G09G 2310/0243* (2013.01); *G09G 2310/0264* (2013.01); *G09G 2310/0286* (2013.01); *G09G 2310/08* (2013.01); *G09G 2320/045* (2013.01); *G09G 2330/12* (2013.01)

(58) Field of Classification Search

CPC ................ G09G 3/006; G09G 3/3233; G09G 2300/0842; G09G 2310/08; G09G 2310/0243; G09G 2310/0264; G09G 2310/0286; G09G 2320/045; G09G 2330/12

USPC .......................................................... 345/214

See application file for complete search history.

(56) References Cited

U.S. PATENT DOCUMENTS

| | | | | |
|---|---|---|---|---|
| 8,564,513 B2 * | 10/2013 | Nathan | G09G 3/3233 345/82 |
| 2005/0140599 A1 * | 6/2005 | Lee | G09G 3/3233 345/76 |
| 2011/0141165 A1 * | 6/2011 | Matsui | G09G 3/3233 345/690 |
| 2011/0227505 A1 * | 9/2011 | Park | H05B 45/60 315/297 |
| 2021/0318773 A1 * | 10/2021 | Kim | G09G 3/3233 |
| 2024/0203364 A1 * | 6/2024 | Park | G09G 3/3266 |

FOREIGN PATENT DOCUMENTS

| | | |
|---|---|---|
| KR | 10-2016-0018969 A | 2/2016 |
| KR | 10-2254074 B1 | 5/2021 |
| KR | 10-2021-0085484 A | 7/2021 |

* cited by examiner

*Primary Examiner* — Tom V Sheng

(74) *Attorney, Agent, or Firm* — Birch, Stewart, Kolasch & Birch, LLP

(57) ABSTRACT

A display apparatus can include a display panel including a subpixel connected to a data line, a bias voltage output circuit configured to output a bias voltage, a switch circuit configured to apply the bias voltage output from the bias voltage output circuit to the data line, and a controller. Also, the controller is configured to receive degradation information about a driving transistor included in the subpixel, and generate a switch control signal for controlling the switch circuit based on the degradation information.

18 Claims, 13 Drawing Sheets

DISPLAY APPARATUS AND DRIVING METHOD THEREOF

CROSS-REFERENCE TO RELATED APPLICATIONS

This application claims priority to Korean Patent Application No. 10-2023-0197233 filed in the Republic of Korea, on Dec. 29, 2023, the entirety of which is hereby incorporated by reference into the present application as if fully set forth herein.

BACKGROUND

Field of the Invention

The present disclosure relates to a display apparatus and a driving method thereof.

Discussion of the Related Art

As information technology advances, the market is growing for display apparatuses which are connection mediums connecting a user with information. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (e.g., a gate signal and a data signal) is supplied to each of the subpixels provided in the display panel, a selected subpixel may transmit light or may self-emit light, and thus, an image can be displayed.

However, characteristics of the subpixels within the display device may change over time, which can impair image quality and shorten the lifespan of the display device. Thus, there exists a need for compensating for or preventing a degradation when a display panel is not driven. Also, there exists a need for being able to compensate degradation of subpixels with a simplified design and can be relatively freely set.

SUMMARY OF THE DISCLOSURE

The present disclosure can apply a voltage for compensating for or preventing a degradation when a display panel is not driven, based on degradation information about a driving transistor, and thus, can increase a lifetime of the display panel. Also, the present disclosure can compensate for or prevent a degradation in the driving transistor, based on a voltage output from a shift register included in the display panel, and thus, can simplify a configuration of a circuit and a control method. Also, the present disclosure can compensate for or prevent a degradation in the driving transistor whenever the display panel is not driven, and thus, a driving voltage compensation margin can be relatively freely set.

To achieve these objects and other advantages and in accordance with the purpose of the disclosure, as embodied and broadly described herein, a display apparatus includes a display panel including a subpixel connected to a data line, a bias voltage output circuit unit configured to output a bias voltage, a switch circuit unit configured to apply the bias voltage, output from the bias voltage output circuit unit, to the data line, and a controller configured to output a switch control signal for controlling the switch circuit unit, in which the controller generates the switch control signal, based on degradation information about a driving transistor included in the subpixel.

The bias voltage can be applied to a gate electrode of the driving transistor.

The controller can generate the switch control signal, based on a threshold voltage shift average value of the driving transistor calculated from the entire display panel.

The switch circuit unit can include a plurality of switches, and each of the plurality of switches can include a first electrode connected to an output terminal of the bias voltage output circuit unit in common, a second electrode divisionally connected to the data line of the display panel, and a control electrode connected to a control signal line to which the switch control signal is applied.

All of turn-on times of the plurality of switches can be equal to one another, or at least one of the turn-on times of the plurality of switches can differ.

A turn-on time of the switch circuit unit can vary based on the amount of threshold voltage shift of the driving transistor.

The switch circuit unit can include a plurality of switches disposed to correspond to data lines of red, green, white, and blue subpixels included in the display panel.

The controller can generate, as a switch off signal, the switch control signal on a subpixel of a color which is less than the threshold voltage shift average value of the driving transistor and can generate, as a switch on signal, the switch control signal on a subpixel of a color which is greater than the threshold voltage shift average value of the driving transistor.

The controller can calculate degradation information about the driving transistor, based on a sensing value transferred from a driver driving the display panel.

In another aspect of the present disclosure, a driving method of a display apparatus includes driving a display panel, a bias voltage output circuit unit configured to output a bias voltage, generating a switch control signal for controlling a switch circuit unit disposed in the display panel when the display panel is in a non-driving state, based on degradation information about a driving transistor included in a subpixel of the display panel, and controlling the switch circuit unit to apply a bias voltage, output from a bias voltage output circuit unit, to the subpixel through a data line of the display panel, based on the switch control signal.

The switch circuit unit can include a plurality of switches, and all of turn-on times of the plurality of switches can be equal to one another, or at least one of the turn-on times of the plurality of switches differs.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Hereinafter, the present disclosure will be described more fully with reference to the accompanying drawings, in which exemplary embodiments of the disclosure are shown. The disclosure can, however, be embodied in many different forms and should not be construed as being limited to the embodiments set forth herein; rather, these embodiments are provided so that this disclosure will be thorough and complete, and will fully convey the concept of the disclosure to those skilled in the art.

The features of various embodiments of the present disclosure can be partially or entirely coupled to or combined with each other and can be interlocked and operated in technically various ways, and the embodiments can be carried out independently of or in association with each other. Also, the term "can" used herein includes all definitions of the term "may."

A display apparatus according to the present disclosure can be applied to televisions (TVs), video players, personal computers (PCs), home theaters, electronic devices for vehicles, and smartphones, but is not limited thereto. The display apparatus according to the present disclosure can be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example.

Moreover, a transistor described below can be implemented with an n-type transistor, a p-type transistor, or a combination of an n-type transistor and a p-type transistor. A transistor can be a three-electrode element including a gate, a source, and a drain. The source can be an electrode which provides a carrier to a transistor. In the transistor, a carrier can start to flow from the source. The drain can be an electrode where the carrier flows from the transistor to the outside. That is, in the transistor, the carrier flows from the source to the drain.

In the p-type transistor, because a carrier is a hole, a source voltage can be higher than a drain voltage so that the hole flows from the source to the drain. In the p-type transistor, because the hole flows from the source to the drain, a current can flow from the source to the drain. On the other hand, in the n-type transistor, because a carrier is an electron, a source voltage can be lower than a drain voltage so that the electron flows from the source to the drain. In the n-type transistor, because the electron flows from the drain to the source, a current can flow from the drain to the source. However, a source and a drain of a transistor can switch therebetween based on a voltage applied thereto. Based thereon, in the following description, one of a source and a drain will be described as a first electrode, and the other of the source and the drain will be described as a second electrode.

Figure 1:
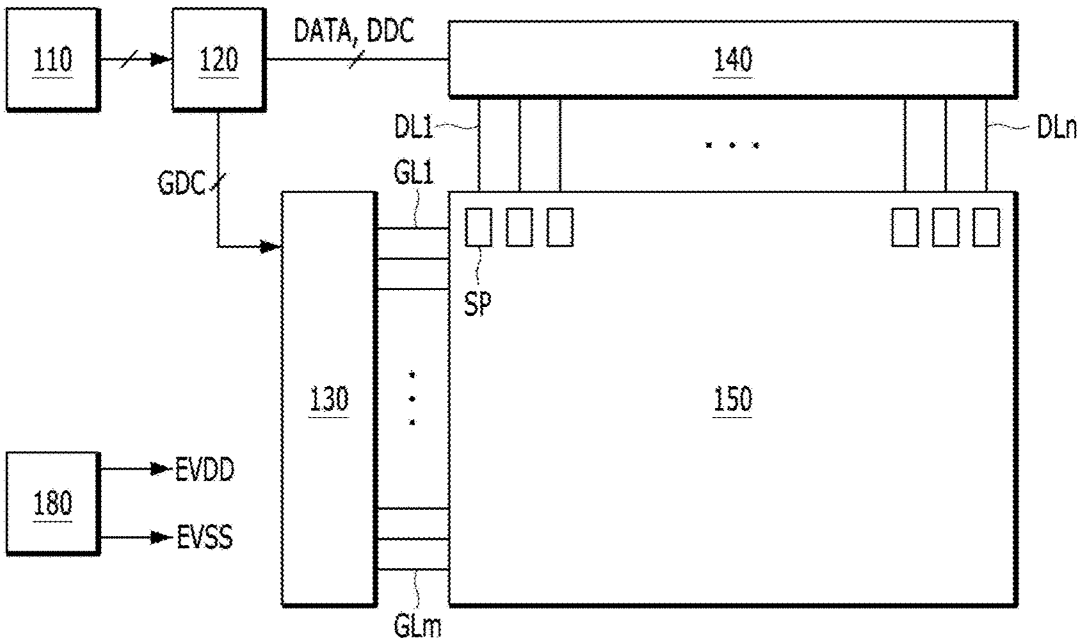
FIG. 1 is a block diagram schematically illustrating a light emitting display apparatus according to an embodiment of the present disclosure.
Figure 2:
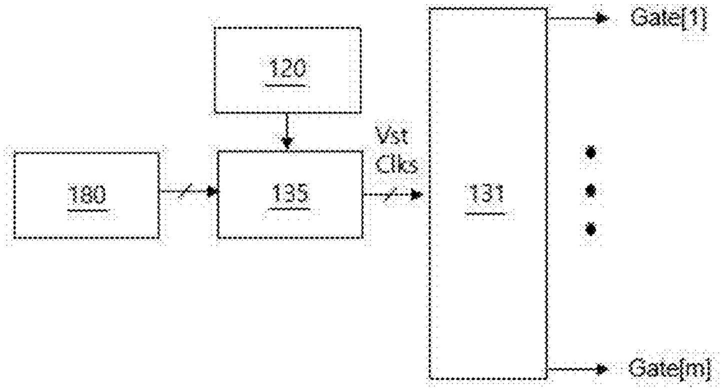
FIGS. 2 and 3 are diagrams for describing a configuration of a scan driver of a gate in panel (GIP) type according to an embodiment of the present disclosure.
Figure 3:
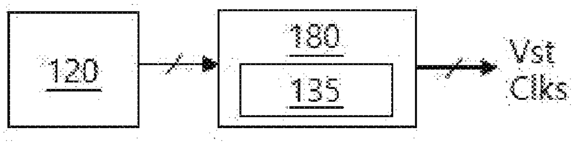

FIG. 1 is a block diagram schematically illustrating a light emitting display apparatus, and FIGS. 2 and 3 are diagrams for describing a configuration of a scan driver of a gate in panel (GIP) type.

As illustrated in FIG. 1, a light emitting display apparatus according to an embodiment of the present disclosure can include a video supply unit 110, a timing controller 120, a gate driver 130, a data driver 140, a display panel 150, and a power supply 180.

The video supply unit 110 (e.g., a set or a host system) can output a video data signal supplied from the outside or an image data signal stored in an internal memory thereof. The video supply unit 110 can supply a data signal and the various driving signals to the timing controller 120.

The timing controller 120 can output a gate timing control signal GDC for controlling an operation timing of the scan driver 130, a data timing control signal DDC for controlling an operation timing of the data driver 140, and various synchronization signals (e.g., a vertical synchronization signal Vsync and a horizontal synchronization signal Hsync). The timing controller 120 can provide the data driver 140 with the data timing control signal DDC and a data signal DATA supplied from the video supply unit 110. The timing controller 120 can be implemented as an integrated circuit (IC) type and can be mounted on a printed circuit board (PCB), but is not limited thereto.

The scan driver 130 can output a gate signal (or a gate voltage) in response to the gate timing control signal GDC supplied from the timing controller 120. The scan driver 130 can supply the gate signal to a plurality of subpixels, included in the display panel 150, through a plurality of gate lines GL1 to GLm, where m is a real number. The scan driver 130 can be implemented as an IC type or can be directly provided on the display panel 150 in a GIP type, but is not limited thereto.

In response to the data timing control signal DDC supplied from the timing controller 120, the data driver 140 can sample and latch the data signal DATA, convert a digital data signal into an analog data voltage based on a gamma reference voltage, and output the analog data voltage. The data driver 140 can respectively supply data voltages to the subpixels of the display panel 150 through a plurality of data lines DL1 to DLn where n is a real number. The data driver 140 can be implemented as an IC type or can be mounted on the display panel 150 or a PCB, but is not limited thereto.

The power supply 180 can generate a high voltage and a low voltage based on an external input voltage supplied from the outside and can output the high voltage and the low voltage through a high voltage line EVDD and a low voltage line EVSS. The power supply 180 can generate and output a voltage (e.g., a gate high voltage and a gate low voltage) needed for driving of the scan driver 130 or a voltage (e.g., a drain voltage and a half drain voltage) needed for driving of the data driver 140, in addition to the high voltage and the low voltage.

The display panel 150 can display an image, based on the high voltage, the low voltage, and a driving signal including the gate signal and a data voltage. The subpixels of the display panel 150 can each self-emit light (e.g., no backlight unit needed). The display panel 150 can be manufactured based on a substrate, having stiffness or flexibility, such as glass, silicon, or polyimide. Also, the subpixels emitting light can include pixels including red, green, and blue, or can include pixels including red, green, blue, and white.

Hereinabove, each of the timing controller 120, the scan driver 130, and the data driver 140 has been described as an individual element. However, based on an implementation type of the light emitting display apparatus, one or more of the timing controller 120, the scan driver 130, and the data driver 140 can be integrated into one IC.

As illustrated in FIGS. 2 and 3, a GIP-type scan driver can include a shift register 131 and a level shifter 135. The level shifter 135 can generate scan clock signals Clks and a start signal Vst, based on signals and voltages output from the timing controller 120 and the power supply 180.

The shift register 131 can operate based on the clock signals Clks and the start signal Vst output from the level shifter 135 and can output gate signals Gate[1] to Gate[m] for turning on or off a transistor formed in the display panel. The shift register 131 can be formed as a thin film type in the display panel, based on a GIP type.

The level shifter 135 can be independently provided as an IC type unlike the shift register 131, or can be included in the power supply 180. However, this can be merely an embodiment, and embodiments of the present disclosure are not limited thereto.

Figure 4:
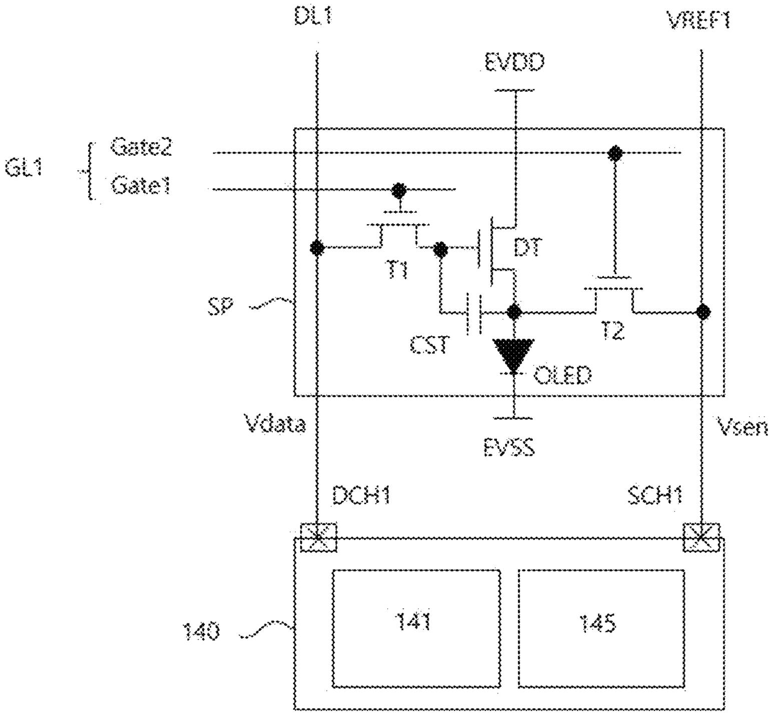
FIG. 4 is a diagram schematically illustrating a subpixel and a data driver according to an embodiment of the present disclosure.
Figure 5:
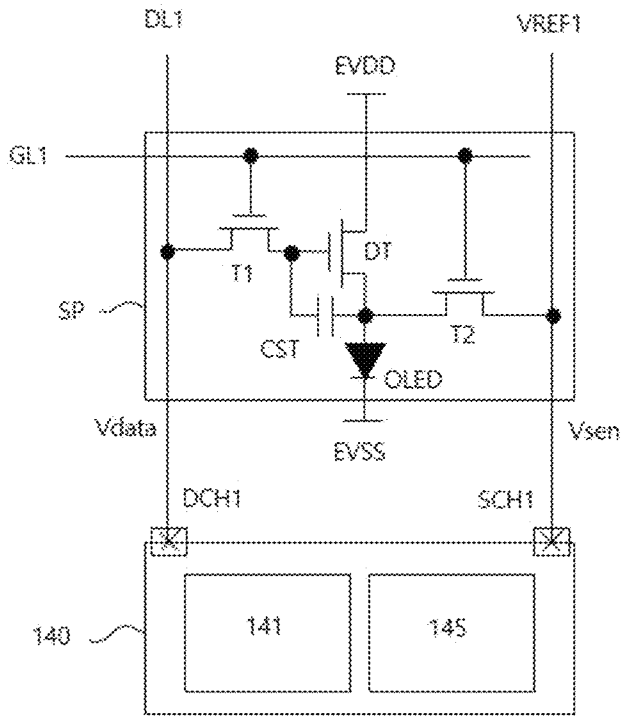
FIG. 5 is a diagram schematically illustrating a subpixel and a data driver according to another embodiment of the present disclosure.
Figure 6:
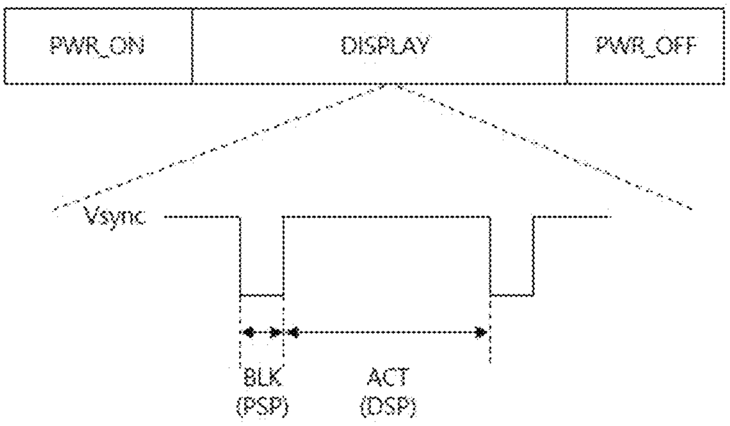
FIG. 6 is a waveform diagram for describing a sensing period and a display period according to an embodiment of the present disclosure.

FIG. 4 is a diagram schematically illustrating a subpixel and a data driver according to a first embodiment of the present disclosure, FIG. 5 is a diagram schematically illustrating a subpixel and a data driver according to a second embodiment of the present disclosure, and FIG. 6 is a waveform diagram for describing a sensing period and a display period according to an embodiment.

As illustrated in FIG. 4, according to the first embodiment, one subpixel SP can include a switching transistor T1, a driving transistor DT, a sensing transistor T2, a capacitor CST, and an organic light emitting diode OLED.

The driving transistor DT can include a gate electrode connected to a first electrode of the capacitor CST, a first electrode connected to a first power line EVDD, and a second electrode connected to an anode electrode of the organic light emitting diode OLED. The capacitor CST can include the first electrode connected to the gate electrode of the driving transistor DT and a second electrode connected to the anode electrode of the organic light emitting diode OLED. The organic light emitting diode OLED can include the anode electrode connected to the second electrode of the driving transistor DT and a cathode electrode connected to a second power line EVSS.

The switching transistor T1 can include a gate electrode connected to a first scan line Gate1 included in a first gate line GL1, a first electrode connected to a first data line DL1, and a second electrode connected to the gate electrode of the driving transistor DT. The sensing transistor T2 can include a gate electrode connected to a second scan line Gate2 included in the first gate line GL1, a first electrode connected to a first reference line VREF1, and a second electrode connected to the anode electrode of the organic light emitting diode OLED.

The sensing transistor T2 can be a type of compensation circuit which is added for compensating for a degradation (e.g., threshold voltage, mobility, etc.) in the driving transistor DT or the organic light emitting diode OLED. The sensing transistor T2 can enable physical threshold voltage sensing, based on a source follower operation of the driving transistor DT. The sensing transistor T2 can operate to obtain a sensing voltage through a sensing node defined between the driving transistor DT and the organic light emitting diode OLED.

According to an embodiment, the data driver 140 can include a driving circuit unit 141 for driving the subpixel SP and a sensing circuit unit 145 for sensing the subpixel SP. The driving circuit unit 141 can be connected to the first data line DL1 through a first data channel DCH1. The driving circuit unit 141 can output, through the first data channel DCH1, a data voltage Vdata for driving the subpixel SP.

The sensing circuit unit 145 can be connected to a first reference line VREF1 through a first sensing channel SCH1. The sensing circuit unit 145 can obtain, through the first sensing channel SCH1, a sensing voltage Vsen sensed from the subpixel SP. The sensing circuit unit 145 can obtain the sensing voltage Vsen, based on a current sensing scheme or a voltage sensing scheme. The sensing circuit unit 145 can convert the sensing voltage Vsen into a digital sensing value to transfer to a timing controller.

As illustrated in FIG. 5, according to a second embodiment, a first gate line GL1 can be integrated as one line. That is, unlike the first embodiment, the first gate line GL1 may not be differentiated from a first scan line and a second scan line. In this situation, the switching transistor T1 and the sensing transistor T2 can be connected to the first gate line GL1 in common, and thus, can be simultaneously turned on or off.

As illustrated in FIG. 6, in an operation of driving a display panel, a light emitting display apparatus according to an embodiment can perform driving schemes differentiated from one another based on a first driving period PWR_ON (e.g., when powering on the display device), a second driving period DISPLAY, and a third driving period PWR_OFF (e.g., when powering off the display device).

In more detail, the first driving period PWR_ON can correspond to a driving start period where power is applied to the display panel, the second driving period DISPLAY can correspond to a panel driving period where driving such as displaying an image is performed after the power is applied to the display panel, and the third driving period PWR_OFF can correspond to a driving end period where the power applied to the display panel is cut off. Also, the third driving period PWR_OFF can be a period where driving is performed for a certain time while displaying black so that a sensing operation of the display panel is performed. That is, the period can be based on that the power applied to the display panel is not completely cut off during the third driving period PWR_OFF. In this way, it can appear to the user that the light emitting display apparatus immediately shuts down in response to an off instruction, but the light emitting display apparatus displays black (displays nothing) but remains on while carrying out the sensing operation before finally shutting down.

The light emitting display apparatus according to an embodiment can sense the display panel in at least one of the first driving period PWR_ON, the second driving period DISPLAY (e.g., during the BLK period), and the third driving period PWR_OFF. To describe the second driving period DISPLAY for example, a blank period BLK included in the vertical synchronization signal Vsync can be defined as a sensing period PSP, and an active period ACT included in the vertical synchronization signal Vsync can be defined as a display period DSP.

Figure 7:
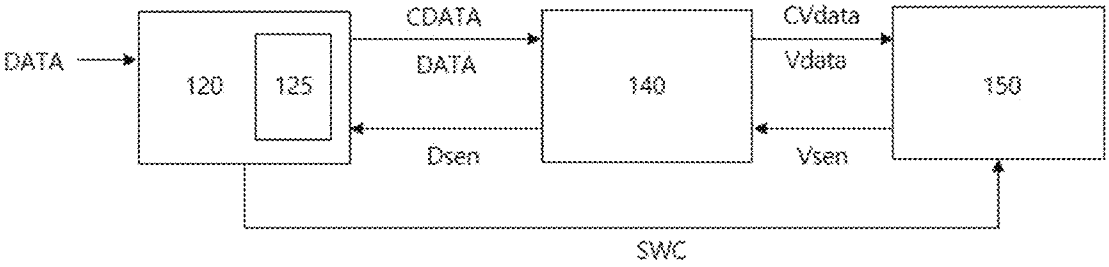
FIG. 7 is a diagram illustrating some elements of a light emitting display apparatus according to an embodiment of the present disclosure.
Figure 8:
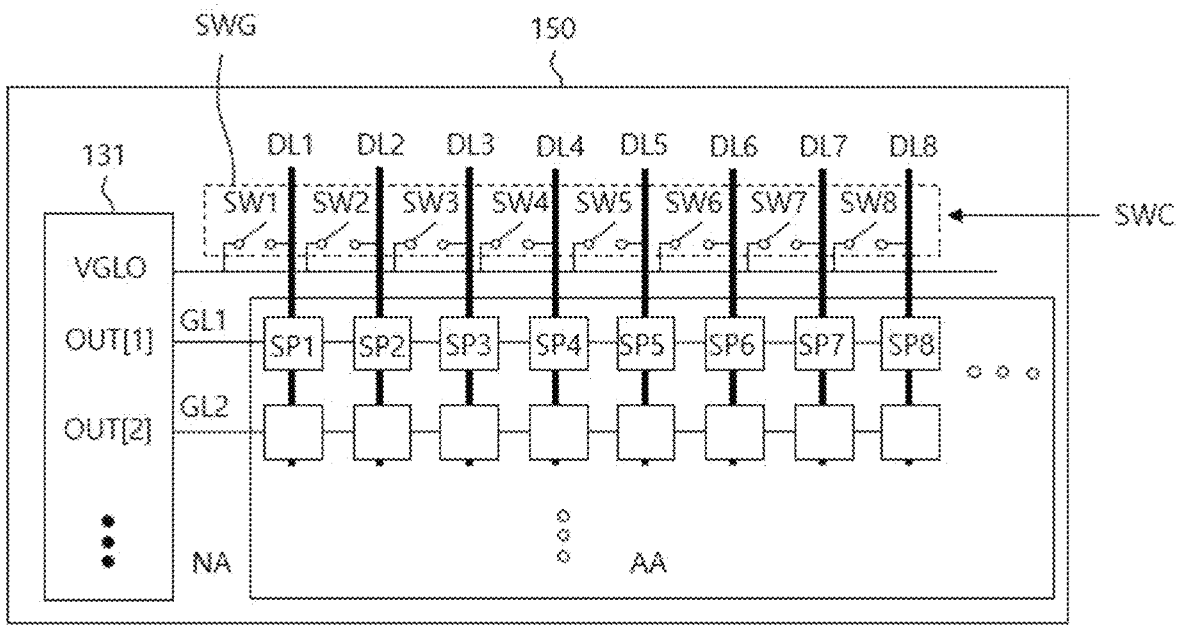
FIG. 8 is a diagram illustrating some elements included in a display panel according to an embodiment of the present disclosure.
Figure 9:
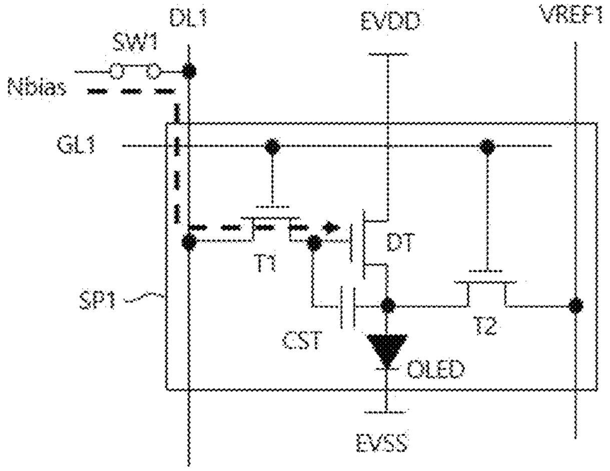
FIG. 9 is a diagram illustrating an example where a negative bias voltage is applied to a subpixel according to an embodiment of the present disclosure.
Figure 10:
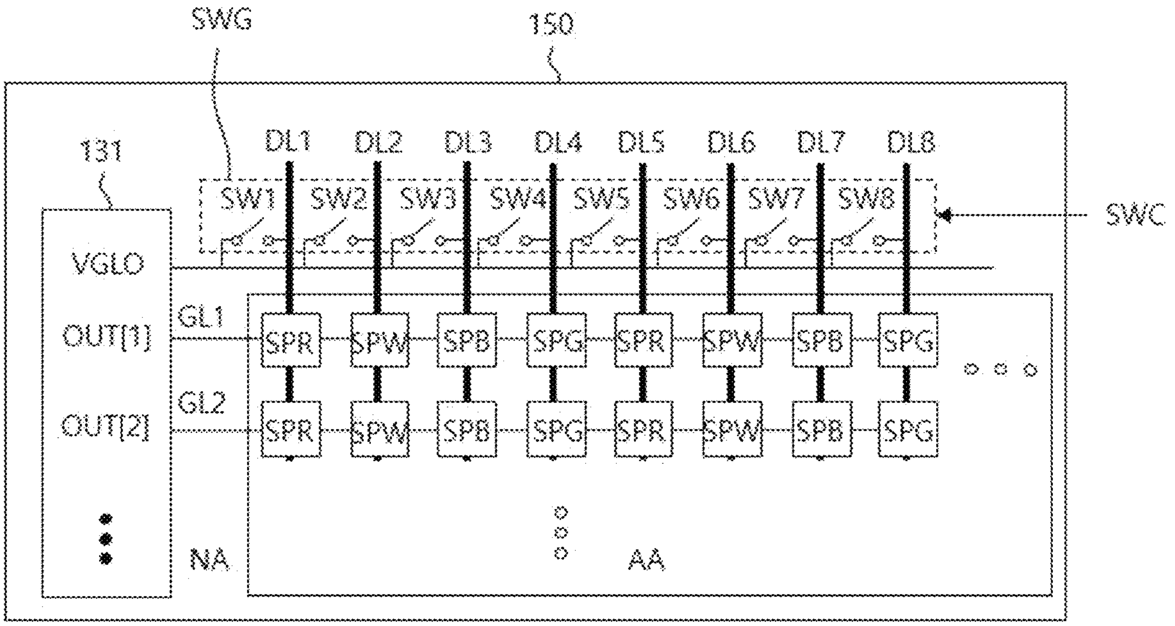
FIG. 10 is a diagram illustrating the arrangement of subpixels illustrated in FIG. 8 according to an embodiment of the present disclosure.

FIG. 7 is a diagram illustrating some elements of a light emitting display apparatus according to a first embodiment, FIG. 8 is a diagram illustrating some elements included in a display panel according to a first embodiment, FIG. 9 is a diagram illustrating an example where a negative bias voltage is applied to a subpixel according to a first embodiment, and FIG. 10 is a diagram illustrating the arrangement of subpixels illustrated in FIG. 8.

As illustrated in FIGS. 7 and 8, according to the first embodiment, a timing controller 120 can include a first degradation compensator 125. The first degradation compensator 125 can calculate degradation information, based on a sensing value Dsen transferred from a data driver 140, and based thereon, the first degradation compensator 125 can compensate for a data signal DATA supplied from the outside to output compensation data CDATA. Here, the sensing value Dsen can correspond to a sensing voltage Vsen sensed from a display panel 150 by sensing driving of the data driver 140. Also, the first degradation compensator 125 can output a switch control signal SWC for controlling the switch circuit unit SWG included in the display panel 150, based on the degradation information.

The display panel 150 can include a switch circuit unit SWG disposed in a non-display area NA. The switch circuit unit SWG can operate based on the switch control signal SWC transferred from the timing controller 120. The switch circuit unit SWG can apply a bias voltage, output through an output terminal VGLO of a shift register 131 (e.g., a bias voltage output circuit unit) disposed in the non-display area NA of the display panel 150, to subpixels SP1 to SP8 disposed in a display area AA. The bias voltage can use one or more different voltage levels output from the shift register 131.

The switch circuit unit SWG can include switches SW1 to SW8. The switches SW1 to SW8 can be disposed to correspond to data lines DL1 to DL8. In other words, the number of switches SW1 to SW8 can be equal to the number of data lines DL1 to DL8.

One or more of the switches SW1 to SW8 can be selectively turned on based on the switch control signal SWC. The switches SW1 to SW8 can each include a first electrode connected to the output terminal VGLO of the shift register 131, a second electrode connected to a corresponding data line of the data lines DL1 to DL8, and a control electrode connected to a control signal line to which the switch control signal SWC is applied.

As illustrated in FIGS. 8 and 9, according to the first embodiment, when a first switch SW1 connected to a first data line DL1 is turned on and a first switching transistor T1 is turned on, a negative bias voltage Nbias can be applied to a gate electrode of a driving transistor DT, e.g., via corresponding data line.

Moreover, in FIG. 9, for example, the negative bias voltage Nbias can be applied for compensating for (Vth positive shift prevention) degradation which occurs because a driving transistor DT included in a first subpixel SP1 is configured as an n-type transistor and a threshold voltage is shifted in a positive direction by a continuously applied positive voltage.

However, when the driving transistor DT included in the first subpixel SP1 is configured as a p-type transistor, a voltage application condition can be changed so that a positive bias voltage is applied. However, in the present disclosure, for example, a negative bias temperature stress (NBTS) effect can be used for compensating for a degradation in an n-type driving transistor DT.

As illustrated in FIG. 10, the display panel 150 can include a red subpixel SPR, a white subpixel SPW, a blue subpixel SPB, and a green subpixel SPG. The red subpixel SPR, the white subpixel SPW, the blue subpixel SPB, and the green subpixel SPG can be defined as one pixel.

The red subpixel SPR can be disposed in the first data line DL1 and a fifth data line DL5, the white subpixel SPW can be disposed in a second data line DL2 and a sixth data line DL6, the blue subpixel SPB can be disposed in a third data line DL3 and a seventh data line DL7, and the green subpixel SPG can be disposed in a fourth data line DL4 and an eighth data line DL8. For example, red subpixels can be grouped together in a same column, white subpixels can be grouped together in a same column, blue subpixels can be grouped together in a same column, and green subpixels can be grouped together in a same column. However, this can be merely an embodiment, and embodiments of the present disclosure are not limited thereto.

Figure 11:
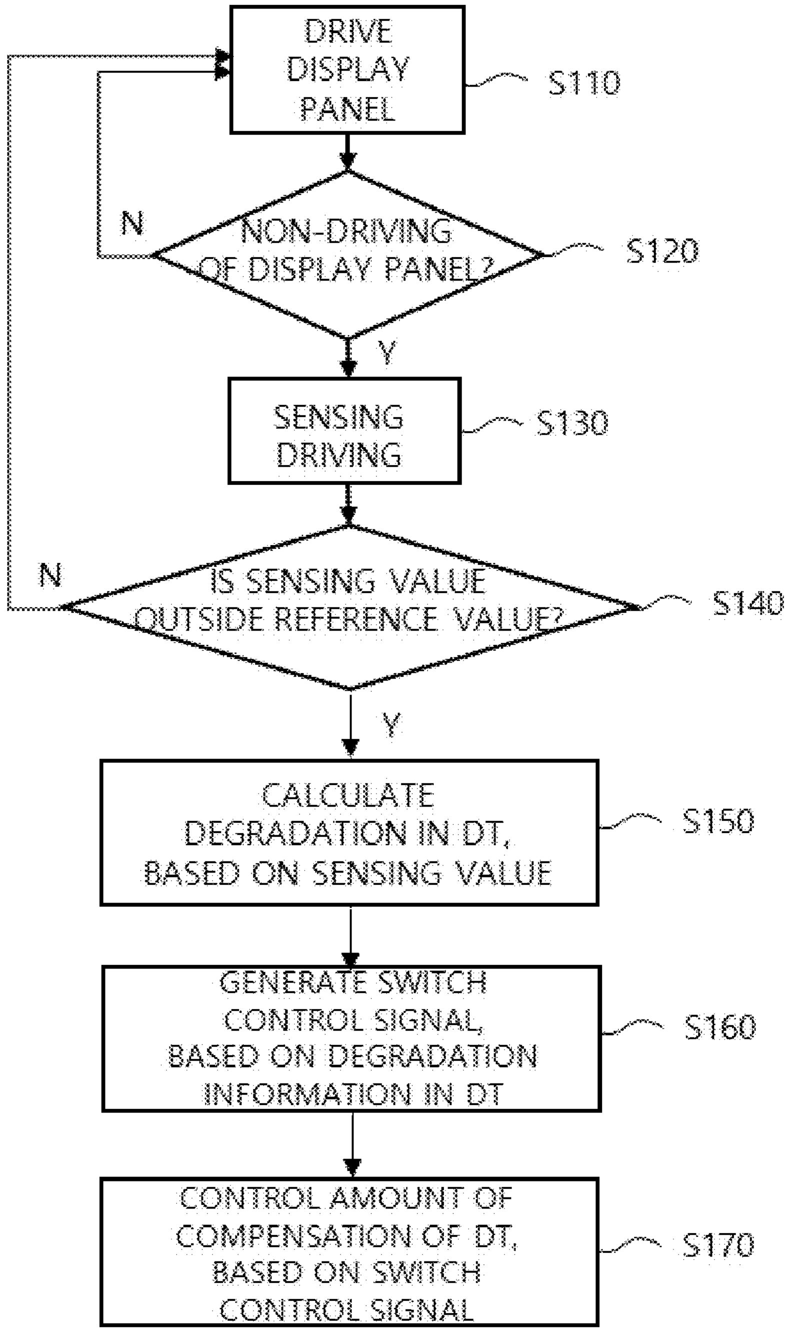
FIG. 11 is a flowchart for describing a driving method of a light emitting display apparatus according to an embodiment of the present disclosure.
Figure 12:
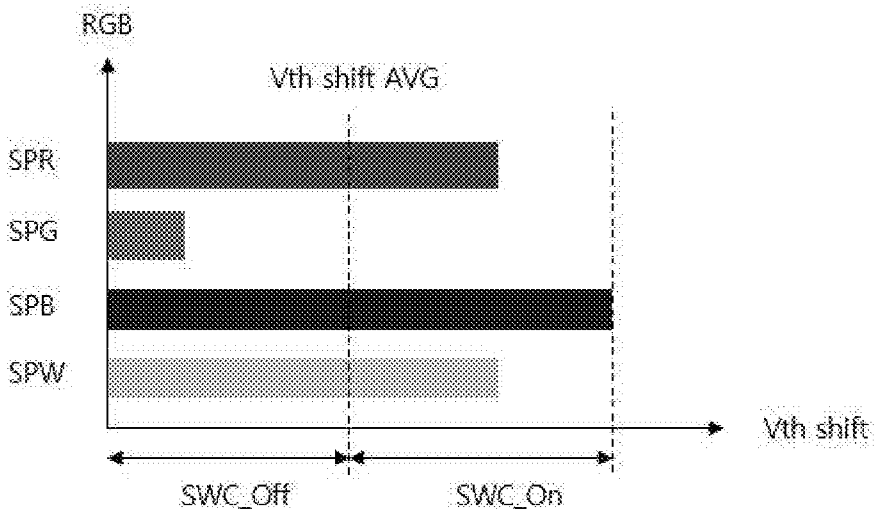
FIG. 12 is a diagram for describing a method of generating a switch control signal by using a sensing value according to an embodiment of the present disclosure.
Figure 13:
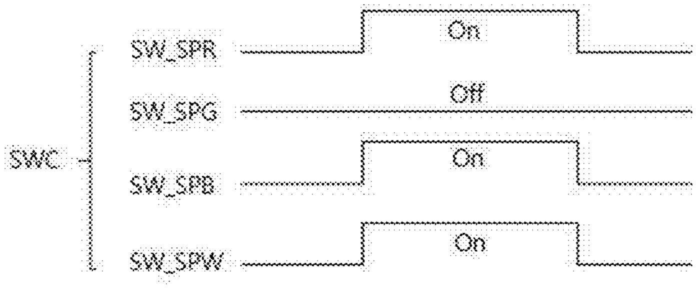
FIGS. 13 and 14 are diagrams of the switch control signal according to an embodiment of the present disclosure.
Figure 14:
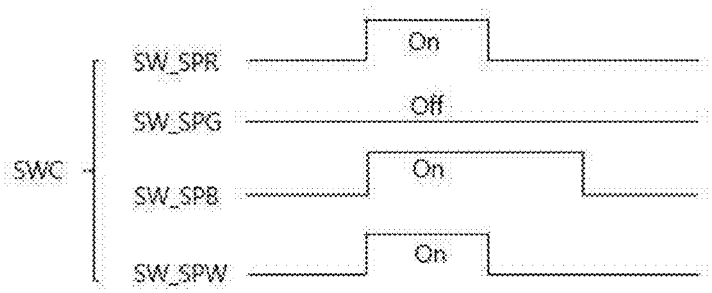

FIG. 11 is a flowchart for describing a driving method of a light emitting display apparatus according to a first embodiment, FIG. 12 is a diagram for describing a method of generating a switch control signal by using a sensing value according to a first embodiment, and FIGS. 13 and 14 are diagrams of the switch control signal.

As illustrated in FIGS. 4, 5, 7 and 11, the light emitting display apparatus according to the first embodiment can generate a switch control signal, based on a sensing value obtained through sensing driving of the display panel 150, and based thereon, the light emitting display apparatus can control the amount of compensation of the driving transistor DT. This will be described below.

The display panel 150 can be driven by the timing controller 120 and the data driver 140 to display an image (S110). The display panel 150 can have a non-driving period (S120). The non-driving period can include a driving end period (see PWR_OFF of FIG. 6) and an idle period (e.g., a screen saver operation period) which is performed when the display panel 150 is not used for a long time.

When a current period corresponds to the non-driving period (Y), a sensing operation of the display panel 150 can be performed (S130). The sensing operation of the display panel 150 can be performed by the data driver 140. The data driver 140 can obtain the sensing voltage Vsen from the display panel 150 through the sensing operation and can convert the sensing voltage Vsen into a digital sensing value Dsen to transfer to the timing controller 120.

The timing controller 120 can determine whether the sensing value Dsen is outside a reference value set therein (S140), such as being greater than or less than the reference value or outside of a predetermined range. When the sensing value Dsen is outside the reference value (Y), the timing controller 120 can calculate an amount of degradation in the driving transistor DT, based on the sensing value Dsen (S150).

The timing controller 120 can generate the switch control signal SWC, based on degradation information about the driving transistor DT (S160), and based thereon, the timing controller 120 can apply a bias voltage to a data line of the display panel and can control the amount of compensation of the driving transistor DT (S170).

As illustrated in FIGS. 7 and 12, the timing controller 120 can differentiate colors from one another like a red subpixel SPR, a white subpixel SPW, a blue subpixel SPB, and a green subpixel SPG to calculate the degradation information about the driving transistor DT, based on the sensing value Dsen. In other words, the timing controller 120 can supply different amounts of compensation to the subpixels according to color (e.g., a first color of subpixels can be treated differently than a second color of subpixels, etc.).

In calculating the degradation information about the driving transistor DT, the timing controller 120 can calculate a threshold voltage shift average value (Vth shift AVG) of the driving transistor DT on an entire display panel, based on a gate line-based and color-based sensing value. Also, the timing controller 120 can generate the switch control signal SWC, based on the threshold voltage shift average value (Vth shift AVG) of the driving transistor DT. In this situation, the switch control signal SWC can be generated as a switch off signal SWC_Off on a subpixel of a color which is less than the threshold voltage shift average value (Vth shift AVG) of the driving transistor DT, and the switch control signal SWC can be generated as a switch on signal SWC_On on a subpixel of a color which is greater than the threshold voltage shift average value (Vth shift AVG) of the driving transistor DT.

In a situation where the threshold voltage shift average value (Vth shift AVG) of the driving transistor DT is calculated as in FIG. 12, the switch control signal SWC can be generated as in FIG. 13 or 14.

FIG. 13 illustrates an example where the switch control signal SWC is configured so that all of a switch SW_SPR connected to the red subpixel, a switch SW_SPB connected to the blue subpixel, and a switch SW_SPW connected to the white subpixel are turned on for the same amount of time (e.g., the pulse widths of the switch control signals SWC can be equal and synchronized).

FIG. 14 illustrates an example where the switch control signal SWC is configured so that the switch SW_SPB connected to the blue subpixel has a turn-on time that is longer than the switch SW_SPR connected to the red subpixel and the switch SW_SPW connected to the white subpixel (e.g., the pulse width of the switch control signal SW_SPB can be greater than the pulse widths of the switch control signals SW_SPR and SW_WSPW). For example, the timing controller 120 can dynamically supply different amounts of compensation to subpixels based on their colors, such as treating an example situation where the white subpixels need more compensation than the red and blue subpixels. In this way, the light emitting display apparatus can provide a finer granularity of control by providing different amounts of compensation based on color. For example, the blue subpixels may have different needs than the red and white subpixels, while the green subpixel may not need any compensation yet.

As seen in the illustrations of FIGS. 13 and 14, according to the first embodiment, the switch control signal SWC can be generated based on the threshold voltage shift average value (Vth shift AVG) of the driving transistor DT, and based on a configuration of the switch circuit unit, the switch control signal SWC can be generated by a common control method where different colored subpixels can receive the same amount of compensation if compensation is needed (FIG. 13), or an individual control method (FIG. 14) where different colored subpixels can receive different amounts of compensation according to their specific needs.

Furthermore, in individual control according to the first embodiment, the switch control signal SWC can be generated based on the threshold voltage shift average value (Vth shift AVG) of the driving transistor DT, and thus, a color-based turn-on time of a switch can vary based on the amount of shift of the driving transistor DT.

Figure 15:
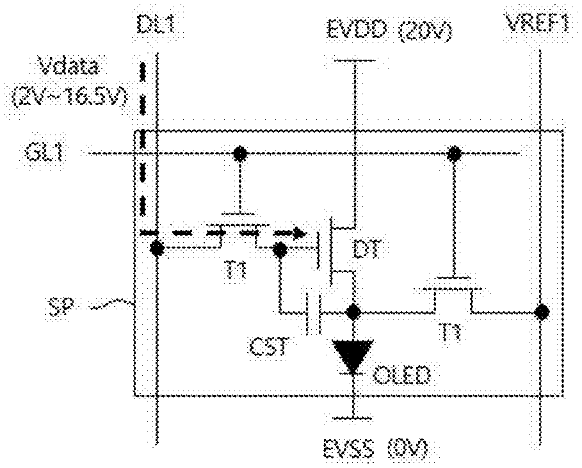
FIG. 15 is a diagram illustrating a data voltage applied to a subpixel in image driving of a display panel according to an embodiment of the present disclosure.
Figure 16:
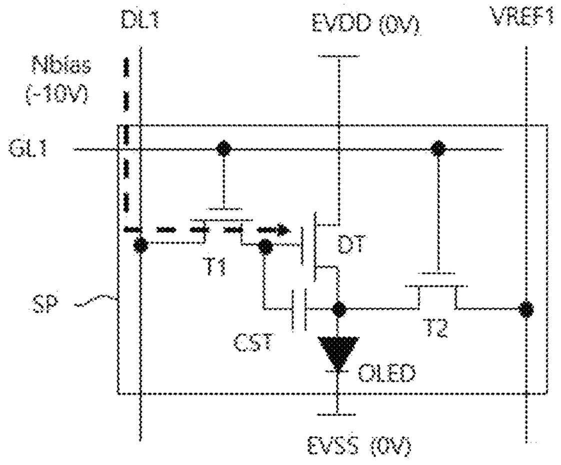
FIG. 16 is a diagram illustrating a negative bias voltage applied to a subpixel in compensation driving of a display panel according to an embodiment of the present disclosure.
Figure 17:
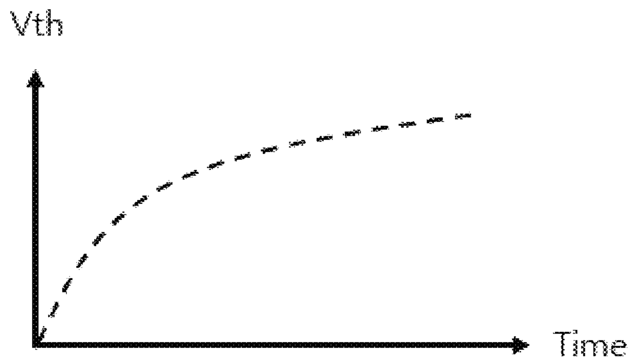
FIGS. 17 to 19 are diagrams for describing a merit of an embodiment of the present disclosure compared to a comparative example.
Figure 18:
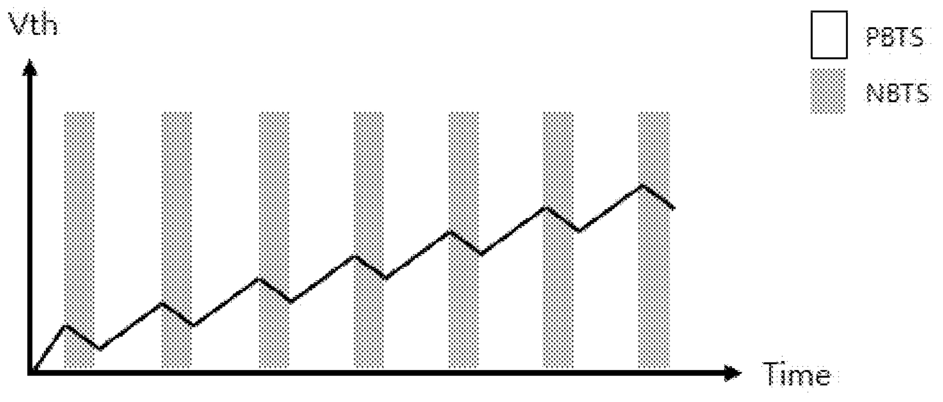
Figure 19:
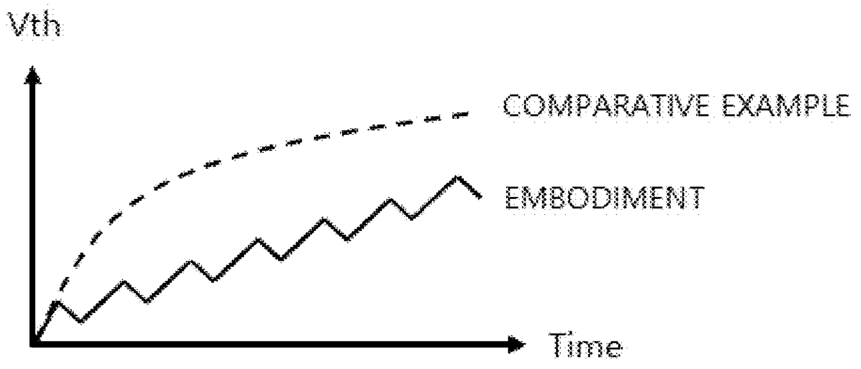

FIG. 15 is a diagram illustrating a data voltage applied to a subpixel in image driving of a display panel according to a first embodiment, FIG. 16 is a diagram illustrating a negative bias voltage applied to a subpixel in compensation driving of a display panel according to a first embodiment, and FIGS. 17 to 19 are diagrams for describing a merit of an embodiment compared to a comparative example.

As illustrated in FIG. 15, in image driving of a display panel, a driving transistor included in a subpixel SP can operate based on a data voltage to apply a driving current. To this end, a data voltage Vdata can be applied to a data line DL1 of the subpixel SP. In this situation, the data voltage Vdata can be output from a data driver and can have a level of about 2 V to about 16.5 V, based on a gray level. Also, in the image driving of the display panel, a high voltage of about 20 V can be applied to a high voltage line EVDD of the subpixel SP, and a low voltage of about 0 V can be applied to a low voltage line EVSS.

As illustrated in FIG. 16, in compensation driving of the display panel, a degradation in a driving transistor included in the subpixel SP can be compensated for based on a bias voltage. To this end, a negative bias voltage Nbias can be applied to a data line DL1 of the subpixel SP. At this time, the negative bias voltage Nbias can be output from a shift register. Also, in a situation where a gate low voltage output from the shift register is used as the negative bias voltage Nbias, the gate low voltage can have a level of about −10 V to about −6 V. Furthermore, in the compensation driving of the display panel, a low voltage of about 0 V can be applied to the high voltage line EVDD and the low voltage line EVSS.

In FIGS. 16 and 17, levels of the data voltage Vdata, the negative bias voltage Nbias, the high voltage, and the low voltage can be illustrated to help understanding, but embodiments are not limited thereto.

As in FIG. 17, in the light emitting display apparatus of the comparative example, a data driver can progressively and inevitably increase a driving voltage to compensate for a phenomenon where a threshold voltage Vth of a driving transistor is shifted over time (e.g., according to a logarithmic growth curve).

As in FIG. 18, the light emitting display apparatus according to an embodiment can have a compensation period of a certain time for negative bias temperature stress (NBTS) where a negative bias voltage is supplied to the driving transistor, for each degradation period of a certain time (positive bias temperature stress (PBTS)) where a phenomenon occurs where a threshold voltage Vth of the driving transistor is shifted over time.

As a result, as seen in FIG. 19, in an embodiment, a driving voltage can progressively increase in the data driver, to compensate for a degradation phenomenon, and an increase width of the driving voltage can be reduced compared to the comparative example. Accordingly, in an embodiment, a driving voltage compensation margin for compensating for the threshold voltage Vth of the driving transistor can be relatively freely set.

Figure 20:
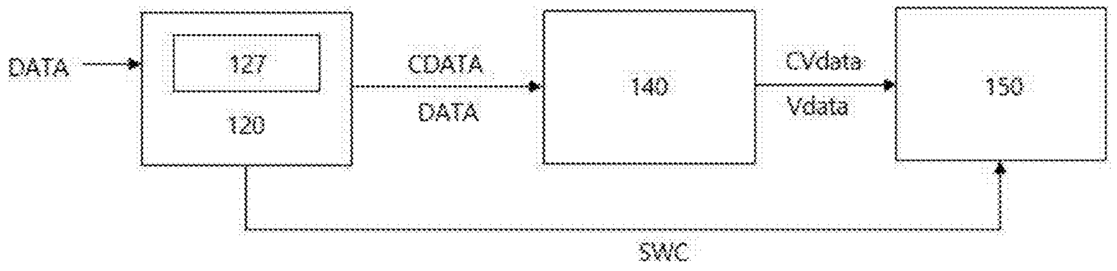
FIG. 20 is a diagram illustrating some elements of a light emitting display apparatus according to another embodiment of the present disclosure.
Figure 21:
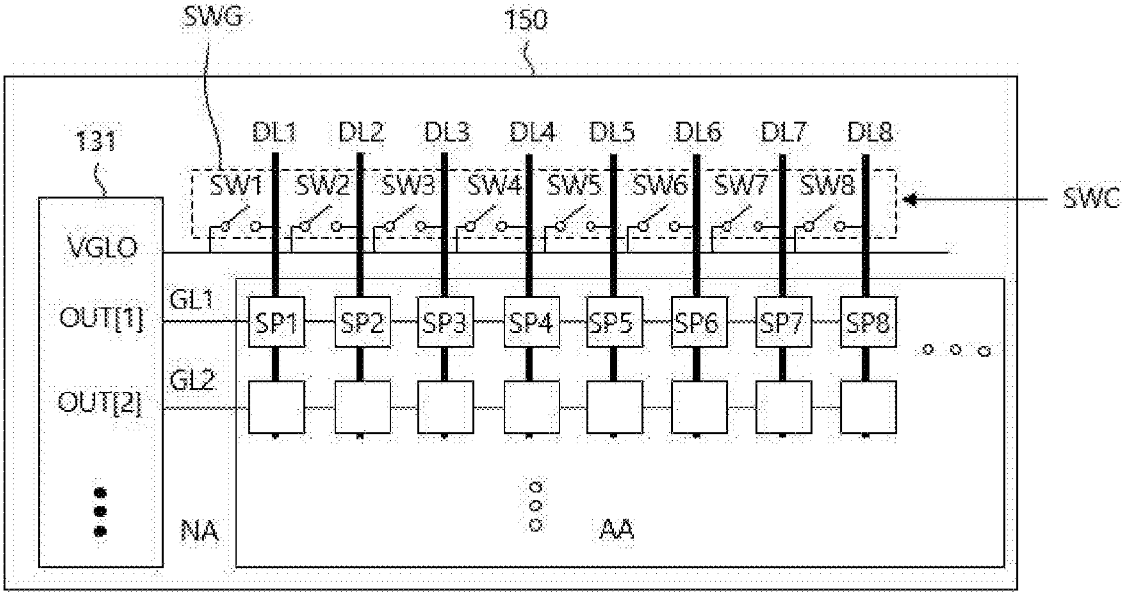
FIG. 21 is a diagram illustrating some elements included in a display panel according to an embodiment of the present disclosure.
Figure 22:
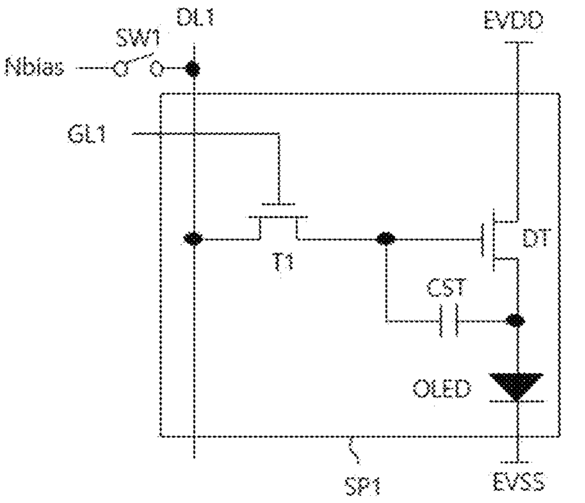
FIGS. 22 and 23 are diagrams illustrating the arrangement of subpixels illustrated in FIG. 21 according to an embodiment of the present disclosure.
Figure 23:
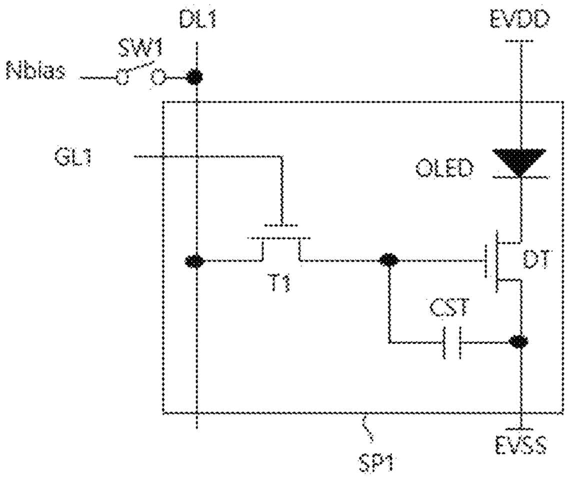

FIG. 20 is a diagram illustrating some elements of a light emitting display apparatus according to a second embodiment, FIG. 21 is a diagram illustrating some elements included in a display panel according to a second embodiment, and FIGS. 22 and 23 are diagrams illustrating the arrangement of subpixels illustrated in FIG. 21.

As illustrated in FIGS. 20 and 21, according to the second embodiment, a timing controller 120 can include a second degradation compensator 127. The second degradation compensator 127 can predict a degradation in an element included in a display panel 150, based on a data signal DATA supplied from the outside, can calculate degradation information, based on the predicted degradation, and can compensate for the data signal DATA to output a compensation signal CDATA, based on the degradation information. Also, the second degradation compensator 127 can output a switch control signal SWC for controlling a switch circuit unit SWG included in the display panel 150, based on the degradation information.

The display panel 150 can include the switch circuit unit SWG disposed in a non-display area NA. The switch circuit unit SWG can operate based on a switch control signal SWC transferred from the timing controller 120. The switch circuit unit SWG can apply a bias voltage, output through an output terminal VGLO of a shift register 131 (e.g., a bias voltage output circuit unit) disposed in the non-display area NA of the display panel 150, to subpixels SP1 to SP8 disposed in a display area AA. The bias voltage can use one or more voltage levels output from the shift register 131.

The switch circuit unit SWG can include switches SW1 to SW8. The switches SW1 to SW8 can be disposed to correspond to data lines DL1 to DL8. In other words, the number of switches SW1 to SW8 can be equal to the number of data lines DL1 to DL8.

One or more of the switches SW1 to SW8 can be selectively turned on based on the switch control signal SWC. The switches SW1 to SW8 can each include a first electrode connected to the output terminal VGLO of the shift register 131, a second electrode connected to a corresponding data line of the data lines DL1 to DL8, and a control electrode connected to a control signal line to which the switch control signal SWC is applied.

As illustrated in FIGS. 22 and 23, according to the second embodiment, a first subpixel SP1 can include a first switching transistor T1, a capacitor CST, a driving transistor DT, and an organic light emitting diode OLED. Here, in the organic light emitting diode OLED, an anode electrode can be connected to a second electrode of the driving transistor DT and a cathode electrode can be connected to a low voltage line EVSS, or the anode electrode can be connected to a high voltage line EVDD and the cathode electrode can be connected to a first electrode of the driving transistor DT.

According to the second embodiment, when a first switch SW1 connected to a first data line DL1 is turned on and a first switching transistor T1 is turned on, a negative bias voltage Nbias can be applied to a gate electrode of a driving transistor DT.

Moreover, in the second embodiment, in a situation where a threshold voltage shift average value (Vth shift AVG) of the driving transistor DT is calculated as in FIG. 12, the switch control signal SWC can be generated as in FIG. 13 or 14, and thus, relevant descriptions can be referred.

The present disclosure can apply a voltage for compensating for or preventing a degradation when a display panel is not driven, based on degradation information about a driving transistor, and thus, can increase a lifetime of the display panel. Also, the present disclosure can compensate for or prevent a degradation in the driving transistor, based on a voltage output from a shift register included in the display panel, and thus, can simplify a configuration of a circuit and a control method. Also, the present disclosure can compensate for or prevent a degradation in the driving transistor whenever the display panel is not driven, and thus, a driving voltage compensation margin can be relatively freely set.

The effects according to the present disclosure are not limited to the above examples, and other various effects can be included in the specification.

While the present disclosure has been particularly shown and described with reference to exemplary embodiments thereof, it will be understood by those of ordinary skill in the art that various changes in form and details can be made therein without departing from the spirit and scope of the present disclosure as defined by the following claims.

What is claimed is:

1. A display apparatus comprising:

a display panel including a subpixel connected to a data line;

a bias voltage output circuit configured to output a bias voltage;

a switch circuit configured to apply the bias voltage, output from the bias voltage output circuit, to the data line; and a controller configured to:

receive degradation information about a driving transistor included in the subpixel, and generate a switch control signal for controlling the switch circuit based on the degradation information, wherein a turn-on time of the switch circuit varies based on an amount of threshold voltage shift of the driving transistor.

2. The display apparatus of claim 1, wherein the bias voltage is applied to a gate electrode of the driving transistor.

3. The display apparatus of claim 1, wherein the controller generates the switch control signal, based on a threshold voltage shift average value of the driving transistor calculated based on a total amount of subpixels in the display panel.

4. The display apparatus of claim 3, wherein the controller is further configured to:

generate the switch control signal having a switch off signal level for a subpixel of a color, which is less than a threshold voltage shift average value of the driving transistor, and generate the switch control signal having a switch on signal level for a subpixel of a color, which is greater than the threshold voltage shift average value of the driving transistor.

5. The display apparatus of claim 1, wherein the switch circuit includes a plurality of switches, and wherein each of the plurality of switches includes a first electrode connected to an output terminal of the bias voltage output circuit in common, a second electrode divisionally connected to a corresponding data line of the display panel, and a control electrode connected to a control signal line configured to receive the switch control signal.

6. The display apparatus of claim 5, wherein all of turn-on times of the plurality of switches are equal to one another, or at least one of the turn-on times of the plurality of switches is different.

7. The display apparatus of claim 1, wherein the switch circuit includes a plurality of switches respectively corresponding to data lines of red, green, white and blue subpixels included in the display panel.

8. The display apparatus of claim 1, wherein the controller is further configured to calculate the degradation information about the driving transistor based on a sensing value transferred from a driver configured to drive the display panel.

9. A driving method of a display apparatus including a display panel, the driving method comprising:

driving the display panel;

generating a switch control signal for controlling a switch circuit disposed in the display panel when the display panel is in a non-driving state, based on degradation information about a driving transistor included in a subpixel of the display panel; and controlling the switch circuit to apply a bias voltage, output from a bias voltage output circuit, to the subpixel through a data line of the display panel, based on the switch control signal, wherein a turn-on time of the switch circuit varies based on an amount of threshold voltage shift of the driving transistor.

10. The driving method of claim 9, wherein the switch circuit includes a plurality of switches, and wherein all of turn-on times of the plurality of switches are equal to one another, or at least one of the turn-on times of the plurality of switches is different.

11. The driving method of claim 9, wherein the bias voltage is applied to a gate electrode of the driving transistor.

12. The driving method of claim 9, wherein the switch control signal is generated based on a threshold voltage shift average value of the driving transistor calculated based on a total amount of subpixels in the display panel.

13. The driving method of claim 12, wherein the switch circuit includes a plurality of switches, and wherein all of turn-on times of the plurality of switches are equal to one another, or at least one of the turn-on times of the plurality of switches is different.

14. The driving method of claim 9, wherein the switch control signal is generated as a switch off signal level for subpixel of a color being less than a threshold voltage shift average value of the driving transistor, and as a switch on signal level for subpixel of a color being greater than the threshold voltage shift average value of the driving transistor.

15. A display apparatus comprising:

a display panel including a plurality of subpixels, a plurality of data lines and a plurality gate lines;

a data driver connected to the plurality of data lines;

a gate driver connected to the plurality of gate lines and connected to a bias voltage supply line;

a plurality of switches respectively connected between the plurality of data lines and the bias voltage supply line; and a controller configured to:

receive degradation information corresponding to at least one of the plurality of subpixels, and generate a switch control signal based on the degradation information, and supply the switch control signal to at least one of the plurality of switches to connect at least one of the plurality of data lines with the bias voltage supply line, and supply a bias voltage to the at least one of the plurality of subpixels from the gate driver via the bias voltage supply line.

16. The display apparatus of claim 15, wherein a first column of subpixels connected to a first data line among the plurality of data lines have a same first color, wherein a second column of subpixels connected to a second data line among the plurality of data lines have a same second color different than the first color, and wherein the controller is further configured to supply a first compensation amount to the first column of subpixels having the same first color and a second compensation amount to the second column of subpixels having the same second color, the first compensation amount being different than the second compensation amount.

17. The display apparatus of claim 15, wherein the controller is further configured to:

supply a switch control signal to the plurality switches for compensating one or more of the plurality of subpixels during a non-driving period of the display panel.

18. The display apparatus of claim 15, wherein the controller is further configured to:

vary pulse widths of switch control signals supplied to the plurality switches for providing different amounts of bias compensation to different columns of subpixels among the plurality of subpixels.

* * * * *